United States Patent
Mazzapica

[11] Patent Number: 5,930,342
[45] Date of Patent: Jul. 27, 1999

[54] ASSET MANAGEMENT FOR COPIERS AND FACSIMILE MACHINES

[75] Inventor: Paul F. Mazzapica, Austin, Tex.

[73] Assignee: Omnidex Corporation, Austin, Tex.

[21] Appl. No.: 08/947,796

[22] Filed: Oct. 7, 1997

[51] Int. Cl.[6] .................................................. H04M 11/00
[52] U.S. Cl. ............................... 379/102.01; 379/102.04; 379/100.05
[58] Field of Search ......................... 340/825.06, 825.16, 340/825.36; 379/88.19, 88.2, 90.01, 91.01, 93.02, 93.03, 100.05, 102.01, 102.04; 395/183.22, 184.01

[56] References Cited

U.S. PATENT DOCUMENTS 5,673,190  9/1997  Kahleck et al. .................... 340/825.16
5,729,596  3/1998  Reeder et al. ....................... 379/90.01

Primary Examiner—Curtis A. Kuntz
Assistant Examiner—George Eng
Attorney, Agent, or Firm—Jones, Day, Reavis & Pogue

[57] ABSTRACT

This invention relates to an asset management system for deterring the misappropriation or unauthorized movement or use of office equipment, such as copiers and facsimile machines, which are connected to a monitoring network. All of the office devices on the network are linked via telephone lines to remotely located monitoring and security systems. For each device, the remote monitoring system processes its status information, and the remote security system verifies whether it is not in its authorized location by utilizing the automatic number identification (ANI) information provided by the public telephone switching system. If the ANI for an incoming call does not match a preauthorized phone number for the office device making the call, that device may be remotely disabled. The office device may also be disabled automatically for any other reason, including a power loss, a disconnection, a failure to pay for services, or at a customer's request.

14 Claims, 1 Drawing Sheet

ASSET MANAGEMENT FOR COPIERS AND FACSIMILE MACHINES

BACKGROUND OF THE INVENTION

The present invention relates to an asset management system for detecting and deterring the misappropriation or unauthorized movement or use of office equipment such as copiers and facsimile machines.

Over the years, document processing devices such as photocopiers ("copiers") and facsimile machines ("fax machines") have become increasingly important to the business community. These devices provide a convenient and inexpensive method for duplicating and distributing printed documents. In order to reduce maintenance costs, many companies and organizations have installed remote monitoring systems that collect status information from a plurality of copiers and fax machines. Examples of status information include copy counts, paper jam warnings, toner indications, adjustment warnings, malfunction indications, and connection information.

Various methods for reporting and collecting status information are known in the art. Furthermore, various methods for networking a plurality of copiers and fax machines are equally well known in the art. However, the prior art does not disclose an inexpensive method for detecting and deterring the misappropriation or unauthorized movement or use of copiers and fax machines which are connected to a monitoring network. Because these devices are expensive to replace, it is desirable to have a system that can verify whether a device is not in its authorized location and thereby deter misappropriation and unauthorized movement. It also is desirable to have a system that can remotely disable a device that is being used without proper authorization.

SUMMARY OF THE INVENTION

The primary object of the present invention is to provide an asset management system for operation with a monitoring network of copiers, fax machines, and other office equipment.

The present invention comprises a network of office devices such as copiers and fax machines, a plurality of status processors for collecting and transmitting status information, a remote monitoring system for processing status information and disabling particular office devices if necessary, a remote security system for verifying whether office devices are not in their authorized location, and a public telephone switching system capable of generating automatic number identification (ANI) information.

Attached to each office device on the network is a status processor, which is programmed to place a modem call to the remote monitoring system at predetermined intervals. After establishing a modem connection, the status processor transmits a unique identifying code, which is forwarded along with the ANI information, if available, to the remote security system. The security system then compares the ANI information with the stored phone number corresponding to the identifying code. If the two numbers match, the security system authorizes the status processor to transmit its status information to the monitoring system. Otherwise, the security system may instruct the status processor to disable the office device and terminate the connection.

In the event of a power loss or disconnection, the office device may be automatically disabled by the status processor. Similarly, the office device may be disabled for other reasons, including a failure to pay or at a customer's request, when the device calls the remote monitoring system at the predetermined time. Once disabled, the office device cannot perform any of its primary functions without first obtaining authorization from the remote security system. In order to obtain authorization, the status processor must place a call to the monitoring system and repeat the authorization process described above.

The asset management system of the present invention provides an effective and inexpensive method for providing security against the misappropriation and unauthorized movement or use of office equipment. Unlike other security measures, the remote user has no ability whatsoever to alter the ANI information generated by the telephone switching system. Moreover, ANI services are widely available and relatively inexpensive.

BRIEF DESCRIPTION OF THE DRAWINGS

For a more complete understanding of the present invention and the advantages thereof, reference is now made to the following drawings, in which like reference characters indicate like parts.

DETAILED DESCRIPTION OF THE PREFERRED EMBODIMENT

Figure 1:
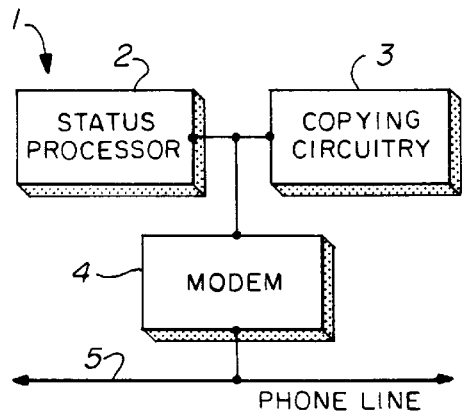
FIG. 1 is a block diagram of a copier.

FIG. 1 is a block diagram of a copier 1. In accordance with the present invention, the copier 1 includes a status processor 2 coupled to a copying circuitry 3. The copying circuitry 3 is one of many designs known in the art. The status processor 2 is a microcomputer with specialized hardware and software designed to monitor the operational status of the copier 1 and to store that information for future transmissions. Examples of status information include copy counts, paper jam warnings, toner indications, adjustment warnings, and malfunction indications.

In order to extract information regarding the status of the copier 1, the status processor 2 utilizes a data tap installed within the copying circuitry 3. A data tap can be installed by making a physical connection to the internal control cables of the copying circuitry 3.

During the operation of the copier 1, the status processor 2 stores the current status information in a conventional memory device. At predetermined intervals, the status processor 2 uses a modem 4 to transmit the status information contained in memory. A modem 4 is a well known device for sending electronic data across regular phone lines 5. The interval between these so-called "call-backs" are set during the configuration of the status processor 2.

The status processor 2 also has the capability of disabling the copier 1 upon request or in the event of a power loss or disconnection. Once disabled, the copier 1 cannot perform any of its primary functions.

Figure 2:
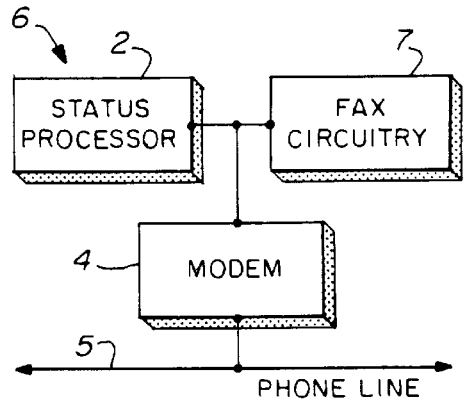
FIG. 2 is a block diagram of a fax machine.

FIG. 2 is a block diagram of a fax machine 6. The fax machine 6 includes a fax circuitry 7 coupled to a status processor 2 and a modem 4. The fax circuitry 7 is one of many designs known in the art. The status processor 2 and the modem 4 generally operate in the same manner as their copier counterparts.

Figure 3:
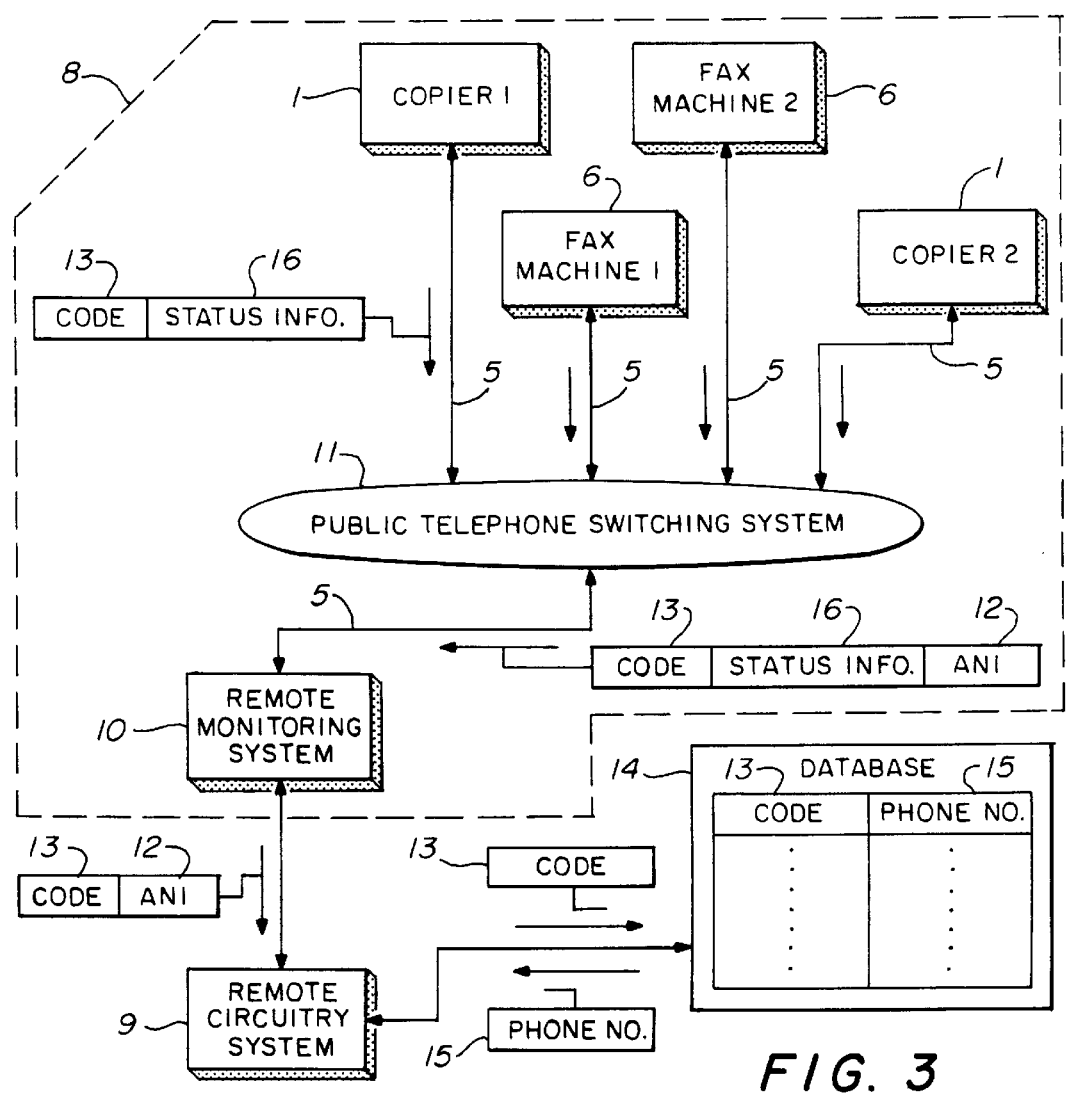
FIG. 3 is a block diagram of a monitoring network of office equipment with a remote security system of the present invention.

FIG. 3 illustrates a monitoring network 8 of office equipment coupled to a remote security system 9 of the present invention. A monitoring network 8 may be formed by connecting a plurality of office equipment such as copiers 1 and fax machines 6 to a remote monitoring system 10. In the preferred embodiment, the connections are made using regular phone lines 5 and the public telephone switching system 11.

The monitoring network 8 operates in generally the same fashion as that disclosed in U.S. Pat. No. 5,084,875 issued Jan. 28, 1992 to Weinberger et al. and U.S. Pat. No. 5,333,286 issued Jul. 26, 1994 to Weinberger et al., which are incorporated herein by reference. The present invention can be distinguished from the two patents referenced above on grounds that the monitoring network 8 is further coupled to a remote security system 9 designed to detect and deter the misappropriation and unauthorized removal or use of office equipment 1 or 6.

The public telephone switching system 11 is particularly characterized by the inclusion of automatic number identification (ANI) equipment designed to automatically trace and identify an incoming call. With this equipment, ANI information 12, including the phone number of the calling station, if available, is automatically determined and made available to the receiving party, which in this case is the remote monitoring system 10.

As indicated above, each office device 1 or 6 is programmed to place a modem call to the remote monitoring system 10 at predetermined intervals. Once a modem connection has been established, the office device 1 or 6 transmits a unique identifying code 13. The identifying code 13 is assigned during the installation of the office device 1 or 6 and cannot be altered by the user.

The remote monitoring system 10 then forwards the identifying code 13 transmitted by the office device 1 or 6 and the ANI information 12 generated by the public telephone switching system 11 to the remote security system 9. The security system 9 maintains a database 14 of phone numbers 15 for all office devices 1 or 6 on the network, indexed by the identifying codes 13.

In order to determine whether office device 1 or 6 is not in its authorized location, the remote security system 9 follows a two-step process. First, the security system 9 accesses the database 14 using the identifying code 13 forwarded by the remote monitoring system 10. If there is a match, the security system 9 retrieves the corresponding phone number 15. Otherwise, the security system 9 sends a message to the monitoring system 10 indicating the use of an unknown device.

Second, the security system 9 compares the retrieved phone number 15 with the ANI information 12 forwarded by the remote monitoring system 10. If there is a match, the security system 9 sends a message to the monitoring system 10 indicating the use of an authorized device. Otherwise, the security system 9 sends a message to the monitoring system 10 indicating the use of a device that has been misappropriated or moved or used without authorization.

Upon receiving a message indicating the use of an authorized device, the remote monitoring system 10 instructs the office device 1 or 6 to transmit its current status information 16. The monitoring system 10 responds to the received status information 16 by transmitting appropriate corrective action, by contacting the owner of the device, by dispatching service personnel, or by generating billing information. The monitoring system 10 can analyze the status information 16 to determine whether corrective adjustments can be transmitted directly to the office device 1 or 6. The monitoring system 10 can also generate a historical file in order to track individual performance.

Upon receiving a message indicating the use of an unknown device, the remote monitoring system 10 simply terminates the modem connection. In contrast, upon receiving a message indicating the use of a device that has been misappropriated or moved or used without authorization, the monitoring system 10 may generate a report indicating that device has been misappropriated or improperly moved. Additionally, the monitoring system 10 may be programmed to instruct the office device 1 or 6 to disable itself in addition to terminating the connection.

As noted previously, the office device 1 or 6 also may be disabled for other reasons, including in the event of a power loss, a disconnection, a failure to pay for service, or at the request of a customer. In the event of a power loss or disconnection, the office device 1 or 6 may be programmed to disable itself. When there is a failure to pay or at a customer's request (or for any other reason), the phone number 15 in the database 14 may be changed to a particular number that will result in the monitoring system 10 instructing the office device 1 or 6 to disable itself. Once disabled, the office device 1 or 6 cannot perform any of its primary functions without first obtaining authorization from the remote security system 9. In order to obtain authorization, the office device 1 or 6 must place a modem call to the remote monitoring system 10 and repeat the authorization process as described above.

In some instances, ANI information is not available for a phone line that is to be connected to the office device 1 or 6. In such a case, the system described herein may still be used, for example, by placing a particular phone number 15 in the database 14 that will cause the security system 9 to send a message to the monitoring system 10 indicating the use of an authorized device.

Variations of the present invention will make themselves apparent to those of ordinary skill in the art and are intended to fall within the spirit and scope of the invention, limited only by the appended claims.

I claim:

1. An asset management system for detecting and deterring the misappropriation or unauthorized movement or use of office equipment, comprising:

a) an office device for processing documents, said office device having a unique identifying code and including circuitry for disabling itself upon request;

b) a monitoring system, coupled to said office device through conventional telephone lines, for receiving and processing status information from said office device, said monitoring system including circuitry for requesting said office device to disable itself in response to a misappropriated or improperly moved or used device signal;

c) a telephone switching system coupled to said telephone lines for routing telephone calls, said telephone switching system including circuitry for automatically generating unique identifying information for incoming calls, which said unique identifying information cannot be altered by the caller; and d) a security system coupled to said monitoring system for verifying whether said office device is not in an authorized location, said security system including i) a file or storage device for storing and retrieving a preauthorized phone number corresponding to said office device and referenced by said unique identifying code;

ii) a comparator for comparing said preauthorized phone number with selected portion of said unique identifying information obtained from said telephone switching system; and iii) circuitry for generating and communicating to said monitoring system said misappropriated or improperly moved or used device signal if said preauthorized phone number and selected portion of said unique identifying information are not exactly identical.

2. The system of claim 1 wherein the said office device is a copier.

3. The system of claim 1 wherein the said office device is a fax machine.

4. A system as in claim 1 in which said office device further includes circuitry for disabling itself in the event of a power loss or disconnection.

5. A system as in claim 1 in which said unique identifying information is obtained from automatic number identification (ANI) information.

6. The asset management system of claim 1 further including circuitry for generating a report indicating that said office device has been misappropriated or improperly moved or used.

7. An asset management system for detecting and deterring the misappropriation or unauthorized movement of office equipment, comprising:

a) a plurality of office devices for processing documents, said office devices each having a unique identifying code and each including circuitry for disabling itself upon request;

b) a monitoring system, coupled to each one of said office devices through conventional telephone lines, for receiving and processing status information from said office devices, said monitoring system including circuitry for requesting any one of said office devices to disable itself in response to a misappropriated or improperly moved or used device signal;

c) a telephone switching system coupled to said telephone lines for routing telephone calls, said telephone switching system including circuitry for automatically generating unique identifying information for incoming calls, which said unique identifying information cannot be altered by the caller; and d) a security system coupled to said monitoring system for verifying the physical location of each one of said office devices, said security system including i) a file or storage device for storing and retrieving a preauthorized phone number corresponding to each one of said office devices and referenced by said unique identifying code;

ii) a comparator for comparing said preauthorized phone number with selected portion of said unique identifying information obtained from said telephone switching system; and iii) means for generating and communicating to said monitoring system a misappropriated or improperly moved or used device signal if said preauthorized phone number and selected portion of said unique identifying information are not exactly identical.

8. The system of claim 7 wherein at least one of said office devices is a copier.

9. The system of claim 7 wherein at least one of said office device is a fax machine.

10. A system as in any one of claim 7, in which each one of said office devices includes circuitry for disabling itself in the event of a power loss or disconnection.

11. A system as in any one of claim 7, in which said unique identifying information is obtained from automatic number identification (ANI) information.

12. An asset management system as in claim 7 further including circuitry for generating a report indicating that any one of said office devices has been misappropriated or improperly moved or used.

13. A method for providing security against the misappropriation or unauthorized movement or use of office equipment, comprising the steps of:

a) generating unique identifying information corresponding to an incoming call in a telephone switching system particularly characterized by including means to automatically trace and identify incoming calls;

b) communicating said unique identifying information to a security system coupled to said telephone switching system, said unique identifying information relating to an office device for processing documents;

c) selectively retrieving a preauthorized phone number for said office device from a file means used for storing preauthorized phone numbers;

d) providing said preauthorized phone number from said file means to a comparator included within said security system;

e) comparing said preauthorized phone number and a selected portion of said unique identifying information within said comparator to determine whether or not said preauthorized phone number and said selected portion of said unique identifying information exactly match; and f) disabling said office device or generating a report, if said preauthorized phone number and said unique identifying information do not exactly match.

14. The method of claim 13 where said unique identifying information is obtained from automatic number identification (ANI) information.

* * * * *

UNITED STATES PATENT AND TRADEMARK OFFICE
CERTIFICATE OF CORRECTION

PATENT NO. : 5,930,342
DATED : July 27, 1999
INVENTOR(S) : Mazzapica

It is certified that error appears in the above-identified patent and that said Letters Patent is hereby corrected as shown below:

On the title page,

Item,

[22]  "Filed: Oct. 7, 1997" should read --Filed: Oct. 8, 1997--.

Item,
[56]  References Cited

Please add the following U.S. Patent Documents:

| | | | |
|---|---|---|---|
| 4,531,023 | 7/1985 | Levine | 179/002.R |
| 5,003,595 | 3/1991 | Collins et al. | 380/25 |
| 5,033,079 | 7/1991 | Catron et al. | 379/100 |
| 5,084,875 | 1/1992 | Weinberger et al. | 371/291 |
| 5,119,295 | 6/1992 | Kapur | 364/412 |
| 5,200,993 | 4/1993 | Wheeler et al. | 379/96 |
| 5,214,772 | 5/1993 | Weinberger et al. | 395/575 |
| 5,333,286 | 7/1994 | Weinberger et al. | 395/575 |
| 5,398,257 | 3/1995 | Groenteman | 375/200 |

Signed and Sealed this

Thirteenth Day of June, 2000

*Attest:*

Q. TODD DICKINSON

*Attesting Officer*       *Director of Patents and Trademarks*